US007266835B2

(12) United States Patent
Halbert

(10) Patent No.: US 7,266,835 B2
(45) Date of Patent: Sep. 4, 2007

(54) METHOD AND APPARATUS FOR SECURE TRANSACTIONS IN AN INTERACTIVE TELEVISION TICKER

(75) Inventor: Richard V. Halbert, Redmond, WA (US)

(73) Assignee: Digeo, Inc., Kirkland, WA (US)

( * ) Notice: Subject to any disclaimer, the term of this patent is extended or adjusted under 35 U.S.C. 154(b) by 0 days.

(21) Appl. No.: 10/186,341

(22) Filed: Jun. 27, 2002

(65) Prior Publication Data
US 2004/0003412 A1    Jan. 1, 2004

(51) Int. Cl.
 H04N 5/445    (2006.01)
 G06F 3/00    (2006.01)
 G06F 13/00    (2006.01)

(52) U.S. Cl. .................... 725/60; 725/40; 725/42; 725/43; 725/44; 725/45; 725/46; 725/50; 725/51; 725/52; 719/328; 705/14; 715/741; 715/742; 715/743; 715/774; 715/719; 715/720; 715/723; 715/726; 715/715; 715/717; 715/718; 715/784; 715/785; 709/227; 709/228; 709/229

(58) Field of Classification Search ............... 725/63, 725/67, 71, 114, 118, 138, 144, 145, 115, 725/40, 42–43, 51–52, 60–61, 32–36, 135, 725/136, 139, 140; 719/328; 705/14; 715/741–743, 715/774, 719–720, 723, 726, 715, 717–718, 715/784–785; 709/227–229
See application file for complete search history.

(56) References Cited
U.S. PATENT DOCUMENTS

| 5,559,548 | A | 9/1996 | Davis et al. .................. 348/6 |
|---|---|---|---|
| 5,589,892 | A | 12/1996 | Knee et al. .................. 348/731 |
| 5,592,212 | A * | 1/1997 | Handelman .................. 725/114 |
| 5,594,509 | A | 1/1997 | Florin et al. ................. 348/731 |
| 5,880,720 | A | 3/1999 | Iwafune et al. ............. 345/327 |
| 6,002,394 | A * | 12/1999 | Schein et al. .................. 725/39 |
| 6,016,141 | A | 1/2000 | Knudson et al. ............. 345/327 |
| 6,052,145 | A | 4/2000 | Macrae et al. ................ 348/10 |
| 6,177,931 | B1 | 1/2001 | Alexander et al. .......... 345/327 |
| 6,182,098 | B1 * | 1/2001 | Selker ........................ 715/526 |
| 6,188,398 | B1 * | 2/2001 | Collins-Rector et al. ...... 725/37 |
| 6,233,734 | B1 | 5/2001 | Macrae et al. ................ 725/50 |
| 6,243,142 | B1 | 6/2001 | Mugura et al. ............. 348/564 |
| 6,348,932 | B1 | 2/2002 | Nishikawa et al. ......... 345/719 |

(Continued)

OTHER PUBLICATIONS

DSO Kids, Privacy Policy and Copyright Notice, Aug. 6, 2001, Dallas Symphony Orchestra, p. 2.*

(Continued)

Primary Examiner—Jason Salce
(74) Attorney, Agent, or Firm—Darby & Darby P.C.; Bruce E. Black

(57) ABSTRACT

A user can perform secure transactions via an interactive television ticker. While viewing an advertisement scrolling in the ticker, the user can select that advertisement to initiate an on-line transaction. That resulting transaction can be performed within the ticker. A visual indicator (such as an icon) can be displayed in the ticker to indicate to the viewer that the transaction is secure, so as to allow confidential information to be safely exchanged. Security can be provided by way of a security application integrated with software of the ticker or by way of another security component with which the ticker software communicates.

45 Claims, 6 Drawing Sheets

U.S. PATENT DOCUMENTS

| | | | |
|---|---|---|---|
| 6,351,270 B1 | 2/2002 | Nishikawa et al. | 345/717 |
| 6,392,664 B1 | 5/2002 | White et al. | 345/717 |
| 6,412,110 B1 | 6/2002 | Schein et al. | 725/40 |
| 6,414,720 B1* | 7/2002 | Tsukidate et al. | 348/469 |
| 6,415,438 B1* | 7/2002 | Blackketter et al. | 725/136 |
| 6,460,180 B1 | 10/2002 | Park et al. | 725/40 |
| 6,519,771 B1 | 2/2003 | Zenith | 725/32 |
| 6,526,577 B1 | 2/2003 | Knudson et al. | 725/40 |
| 6,536,041 B1* | 3/2003 | Knudson et al. | 725/39 |
| 6,557,171 B1* | 4/2003 | Sonoda et al. | 725/136 |
| 6,557,172 B1 | 4/2003 | Carr | 725/139 |
| 6,559,866 B2 | 5/2003 | Kolde et al. | 345/765 |
| 6,560,777 B2 | 5/2003 | Blackketter et al. | 725/110 |
| 6,571,392 B1 | 5/2003 | Zigmond et al. | 725/110 |
| 6,604,242 B1 | 8/2003 | Weinstein et al. | 725/109 |
| 6,615,408 B1* | 9/2003 | Kaiser et al. | 725/112 |
| 6,668,378 B2 | 12/2003 | Leak et al. | 725/136 |
| 6,678,891 B1* | 1/2004 | Wilcox et al. | 725/42 |
| 6,711,552 B1* | 3/2004 | Kay et al. | 705/26 |
| 6,714,992 B1 | 3/2004 | Kanojia et al. | 709/321 |
| 2001/0042251 A1* | 11/2001 | Marshall et al. | 725/60 |
| 2002/0040482 A1* | 4/2002 | Sextro et al. | 725/136 |
| 2002/0059594 A1* | 5/2002 | Rasmussen et al. | 725/37 |
| 2003/0088517 A1* | 5/2003 | Medoff | 705/59 |

OTHER PUBLICATIONS

Mark. R. Brown, Using Netscape 2 Second Edition, Que Corporation, 1995, pp. 290-291.*

"ESPN.com BottomLine" Sports Ticker web pages printed from http://espn.go.com/bottomline/, printed Mar. 5, 2002.

"Liberate TV Ticker" web pages printed from http://solutions.liberate.com/products/tv_ticker.html, printed May 30, 2002.

Office Action mailed Nov. 7, 2003 for applicaton No. 10/186,286, Jun. 27, 2002.

Office Action mailed May 21, 2004 for application No. 10/186,286, filed Jun. 27, 2002.

Office Action mailed Dec. 2, 2004 for application No. 10/186,286, filed Jun. 27, 2002.

Office Action mailed Jun. 15, 2005 for application No. 10/186,286, filed Jun. 27, 2002.

* cited by examiner

METHOD AND APPARATUS FOR SECURE TRANSACTIONS IN AN INTERACTIVE TELEVISION TICKER

BACKGROUND OF THE INVENTION

1. Field of the Invention

This disclosure relates generally to user interaction with information presented on a display device, and in particular but not exclusively, relates to providing secure transactions via an interactive television "ticker."

2. Description of the Related Art

An important business element in the production and distribution of television programming is revenue received from manufacturers and service providers who pay to advertise their products. The ubiquitous television commercial is the manifestation of this enterprise. The survival of a television program is heavily dependent on the advertising revenue that can be realized from the television program. Advertisers in turn rely on the ability of the television program to draw viewers who then become potential purchasers of the advertised products.

Television and Internet technologies are beginning to converge. In particular, access to the World Wide Web via an Internet-enabled television system is progressing and becoming more popular. In a typical scenario, a television commercial can be provided with a "trigger" that renders an icon on television display screen, signaling to the viewers that there is a potential e-commerce opportunity.

Viewers can then obtain information about goods and services that are advertised in the commercial by, for example, connecting to the Internet while viewing the commercial and ordering the advertised products. A user interface for this e-commerce transaction can comprise a hypertext markup language (HTML) web page or pop-up window that is rendered on the display screen as an overlay over the current television program or in full screen.

Unfortunately, these implementations are non-ideal for many viewers. For instance, the viewer can initiate an e-commerce transaction while its corresponding commercial is showing. However, if the viewer does not complete the transaction and close the e-commerce window by the time the commercial ends, then the viewer typically will have to finish the transaction while the television program resumes (or defer the remainder of the transaction until later or start over again at a later time). Keeping the e-commerce window rendered on the display screen is distracting and annoying to viewers (e.g., the viewer who initiated the transaction and other viewers in the room) who wish to enjoy uninterrupted viewing of the television program.

Moreover, since television commercials are directed/broadcasted towards a general viewing audience (as opposed to being provided through an Internet web site that a user has specifically accessed via a personal computer or PC), viewers do not always feel guaranteed that their transactions are secure. For instance, conventional web sites that are accessed via a PC often prompt a user for a password before providing account information and allowing the user to proceed further. Providing such security prompts in a full-screen transaction pop-up window lengthens the amount of time that the pop-up window is rendered on the television display screen—this lengthens, therefore, the time to complete the transaction, thereby increasing viewer distraction and annoyance when the regular programming resumes while the transaction is still being completed.

Thus, while television does provide new opportunities for commerce, it must be remembered that the primary purpose of television is to entertain or inform viewers through television programming. Implementing "banner ads" or pop-up advertisement windows (as is commonly done on the Internet) will annoy viewers who wish to enjoy uninterrupted television programming, rather than encourage them to initiate an e-commerce transaction, which may itself not always appear to be a secure transaction.

BRIEF DESCRIPTION OF THE SEVERAL VIEWS OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Figure 1:
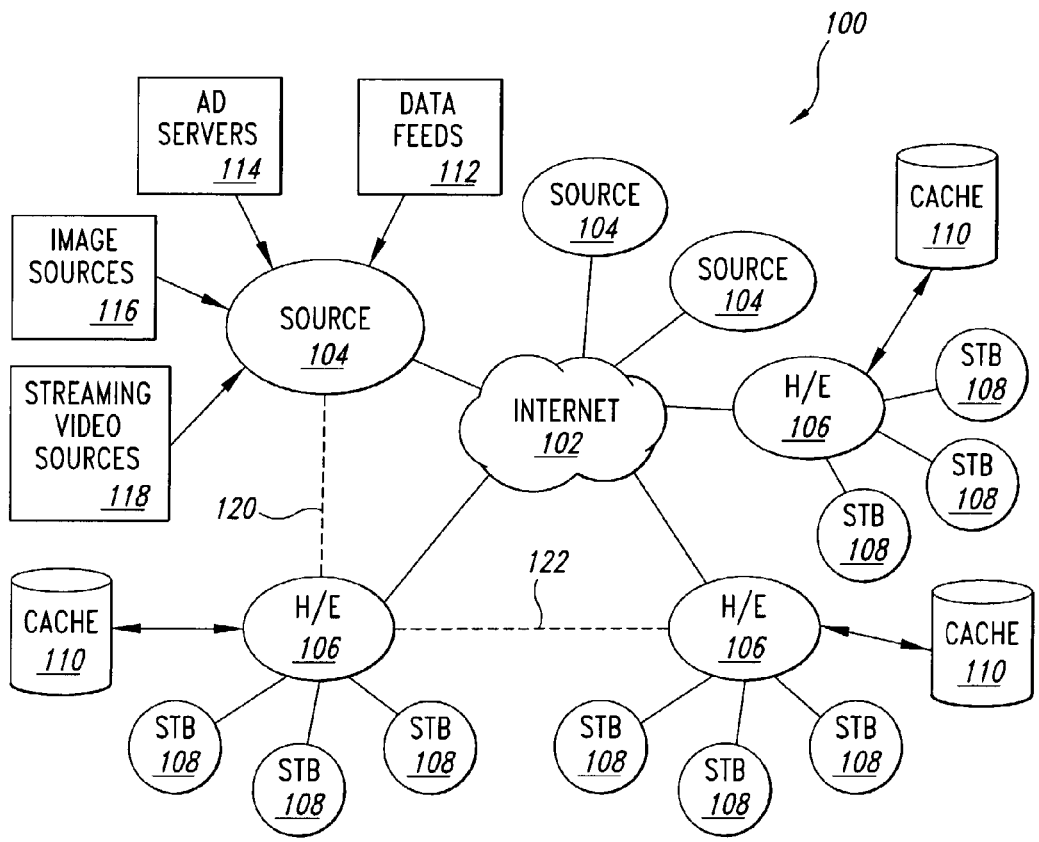
FIG. 1 is a block diagram of an example interactive video casting system that can implement a ticker in accordance with an embodiment of the invention.

Embodiments of techniques to provide secure transactions in a ticker, such as a ticker presented via an interactive television system, are described herein. In the following description, numerous specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, an embodiment of the invention addresses the previously described problems by providing a user or viewer with the capability to perform secure transactions via an interactive television ticker. According to various embodiments, a visual indicator (such as an icon) can be displayed in the ticker to indicate to the viewer that the transaction is secure. The indicator can remain persistent in the ticker as long as the transaction is taking place, regardless of the constantly changing television program or commercial that is concurrently being shown on the television display screen, thereby reassuring the viewer of the continued secure nature of the transaction. In one embodiment, security can be provided by way of a local encryption application or other security application or software with which the ticker software communicates. In another embodiment, the encryption application can form part of the ticker software.

Advertisements (including e-commerce opportunities) are presented in the ticker, alternatively to being presented in windows or banners on the television display screen, and the viewer can conduct a secure transaction within the ticker in response to the advertisements. Because viewers are relatively used to seeing tickers along with their television programming, placing advertisements within the ticker itself provides a less intrusive technique to expose viewers to transaction opportunities (e.g., a ticker occupies a minority portion of the display screen), as compared to increasing the number of television commercials or showing banner advertisements or advertisement windows that interfere with the television program viewing experience.

In one embodiment, the advertisements within the tickers are provided with hypertext links or other types of links. If selected, these links provide a connection to a merchant web site, an interactive shopping channel or other synthetic channel, or other location from which the viewer can conduct a secure transaction or obtain more information on advertised products. In an embodiment, the viewer can conduct the secure transaction itself within a user interface containing the ticker, rather than through a separate transaction window. This embodiment further reduces interference with television programming (e.g., viewer distraction) because the transaction is performed in the minority space occupied by the ticker on the display screen, which is a location where viewers readily accept presentation of information.

Although various embodiments of the invention are described herein in the context of secure transactions for e-commerce purposes, it is appreciated that other embodiments may be implemented for non-commercial transactions where the viewer wishes to communicate securely. Examples, include but are not limited to, transmitting club membership information, voting in an election, posting messages, participating in a poll, requesting information, and others.

The term "ticker" as used herein is intended to generally describe a presentation of information on a display screen, such as a display screen for a television, and is not intended to be limited solely to implementations where the information is presented in a manner to exactly mimic a stock market ticker. In one embodiment, the ticker can comprise text and graphics that are scrolled or otherwise presented in a region of the display screen, along with a television image (such as an image from a live broadcast or from a recorded program).

Various embodiments will be described herein in the context of "scrolling" the ticker information. It is to be appreciated that the term "scrolling" is merely illustrative of a technique to present dynamic ticker information, and that this term, in some embodiments, can encompass implementations where the ticker information is presented via screen segments of information, text segments, one-line-at-a-time, one-sentence-at-a-time, one-word-at-a-time, and the like, rather than the traditional format of one-character-at-a-time typically associated with stock market tickers. Moreover, the term "scrolling" is used generically herein for simplicity to refer not only to vertical movement from bottom to top, but also movement from right to left (often referred to as "crawl") or movement in other directions.

FIG. 1 shows an example of an interactive video casting system 100 for distributing ticker content, Internet content, and television content according to an embodiment of the invention. In accordance with an embodiment of the present invention, the system 100 can be integrated with a cable television distribution system to provide interactive television tickers. The system 100 includes an Internet 102, a plurality of content sources 104, a plurality of distribution centers (depicted as the head-ends or H/Es 106), and a plurality of client terminals 108 (depicted as set top boxes). In addition, a content source 104 is depicted as receiving data from data feeds 112, advertisement servers 114, image sources 116, and streaming video sources 118. The content source 104 may also receive content from a broadcast video source. For the sake of clarity and to avoid clutter, not all of these sources are shown in FIG. 1 for each content source 104.

The plurality of content sources 104 is coupled to the Internet 102. For example, a content source 104 may comprise a web site portal such as Go2Net.com™, or a news web site such as CNN.com™, or other types of sources. Each content source 104 may have various data feeds 112, servers 114, and sources 116/118 coupled to it.

Figure 2:
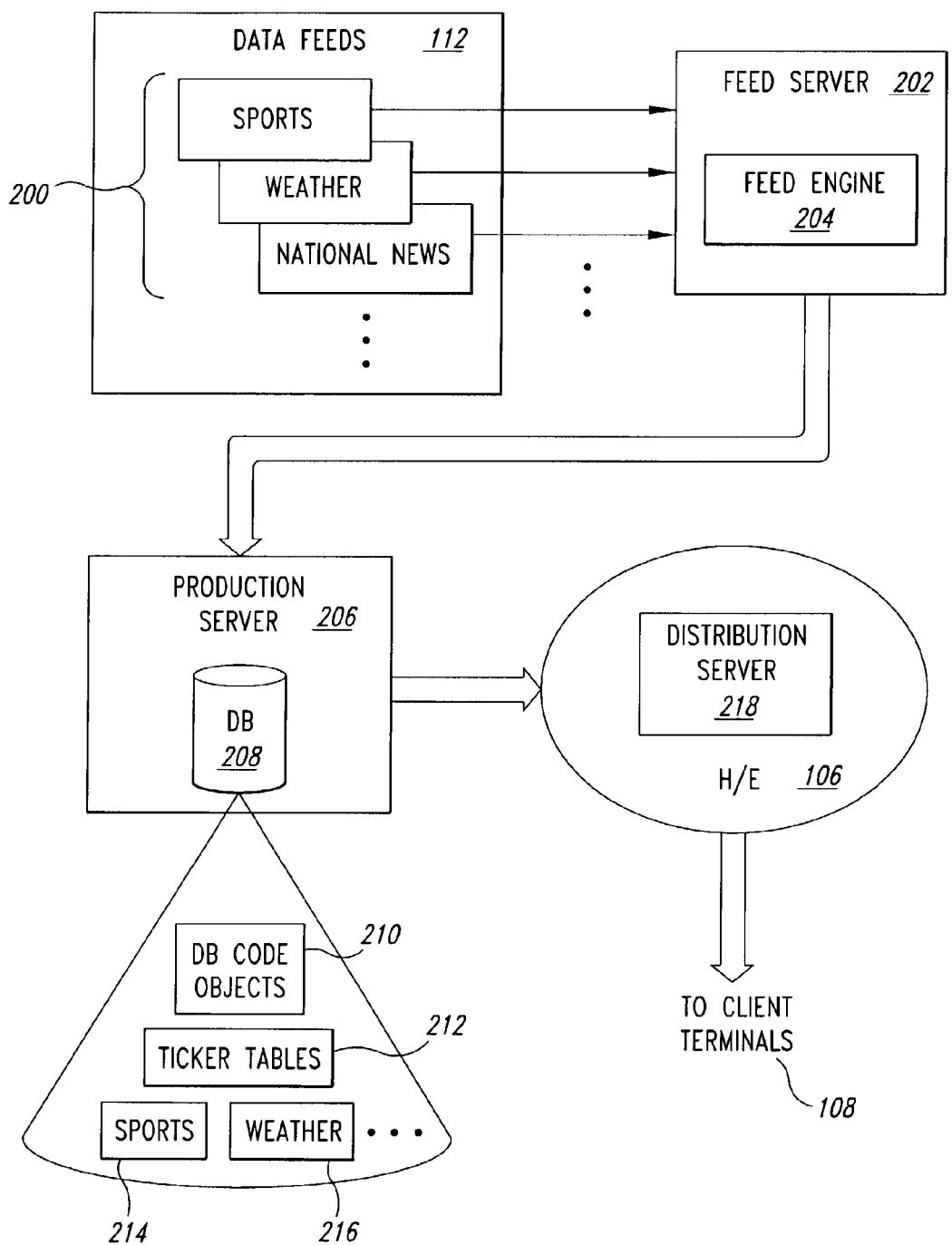
FIG. 2 is a block diagram illustrating example components that can be included in the system of FIG. 1 to provide a ticker in accordance with an embodiment of the invention.

For example, news or stock quote feeds 112 (including data for tickers) may be fed into the content source 104. Servers 114 may provide advertisements for insertion into multimedia content delivered by the content source 104 in accordance with one embodiment of the invention. Sources 116 and 118 may provide images 116, streaming video 118, and other content to the content source 104. Various other feeds, servers, and sources may also be coupled to the content source 104 of FIG. 1. An example configuration of components that can be integrated with the system 100 to provide ticker information to client terminals 108 is shown in FIG. 2.

The Internet 102 comprises a network of networks and is well known in the art. Communications over the Internet 102 can be accomplished using standard protocols such as transmission control protocol/internet protocol (TCP/IP), hypertext transfer protocol (HTTP), file transfer protocol (FTP), or other protocols. Web sites, such as merchant web sites, can be included within or otherwise be in communication with the Internet 102. The Internet 102 is coupled to the plurality of distribution centers 106, and each distribution center 106 is in turn coupled to a plurality of client terminals 108, which may comprise a set top box, a PC, an interactive television set, or another type of communication device or display device.

In alternative or in addition to the Internet 102 being used to distribute multimedia content (including ticker data and advertisements) from the content sources 104 to distribution centers 106, communications channels or networks 120 (which can include satellite delivery sources/networks) apart from the Internet 102 may couple one or more content sources 104 to one or more distribution centers 106. One example of such an alternate path for communications is illustrated by a first dashed line 120 in FIG. 1. Alternately or additionally, peering connections may exist between distribution centers 106. One example of such peering is illustrated by a second dashed line 122 in FIG. 1. Other communications configurations are also possible and are included within the scope of the present invention.

Caches 110 may be provided at (or otherwise coupled to) the distribution centers 106. Such caches 110 may be used to increase the performance in the delivery of multimedia content (including ticker data and advertisements) to the client terminals 108. For example, larger files for video and other high bandwidth content may be stored in such caches 110, which may be closer-in-time to the client terminals 108 than to the content sources 104. In addition, reliability and guaranteed bandwidth may be provided because the Internet 102 is not in-between such caches 110 and the client terminals 108. In one embodiment, the caches 110 or other storage media in the system 100 can store ticker information and advertisements, rather than or in addition to having such information buffered, cached, or otherwise stored at the client side.

In an embodiment, servers may be present in the distribution centers 106, with such servers including or being coupled to the caches 110 or other storage media. Alternatively or in addition, these servers may be located remotely from but still communicatively coupled to the distribution centers 106, via the Internet 102 or other communications channels or networks. Examples of such servers that can be used in connection with providing ticker information to client terminals 108 are shown in FIG. 2.

In accordance with one embodiment of the invention, different or multiple portals may be used to access the information provided through the interactive video casting systems of FIG. 1, based on the type of client terminal being used by the end user. That is, for example, a television portal may be provided for an end user that uses a television set coupled to the client terminal 108 to access the information. A PC portal may be provided for an end user that uses a PC to access the information. Portals can be provided for end users that use cellular telephones, personal digital assistants (PDAs), audio devices, and the like to access the interactive video casting system 100 of FIG. 1.

Such portals may be provided in several possible ways. In one embodiment, the client terminal (e.g., the end user's display device or audio device) can be suitably configured with an adapter that includes hardware and software. The adapter converts the television signals, the Internet or web page content, or other information provided from the interactive video casting system into a digitized format or other format that is compatible with the operational features of the particular client terminal 108.

In another embodiment, a cable service provider can deliver signals having different formats to the various client terminals 108, with the client terminals not necessarily having special adapters. Therefore, as an example, the cable service provider or other party can generate/deliver information (e.g., television programming, web page content, ticker information, and the like) having a format that is compatible for end users that receive the information via a television set. The cable service provider or other party can also generate/deliver the same information (e.g., simultaneously with the television portal on the same communication link, separately on a different communication link, on-demand independent of the television portal, and the like) using a format that is compatible with end users that receive the information via PCs, PDAs, cellular telephones, and the like. Thus, the term "interactive video casting system" is used to describe generally a system that can deliver video information and other information over any network and any network-compatible device by broadcasting, multicasting, or unicasting. An "interactive television system" is one type of or one means of access to an "interactive video casting system."

FIG. 2 is a block diagram illustrating example components that can be included in the system 100 of FIG. 1 to provide data for tickers in accordance with an embodiment of the invention. The data feeds 112 include a plurality of different ticker data feeds 200 that provide a variety of different topical data that can be displayed in a ticker. For instance, the different ticker data can include sports data, weather data, national news, and so forth. The sources that can provide this data can include entities such as Reuters™, The Sporting News™ (TSN), Associated Press™ (AP™), and others (including feeds that can provide advertisements or other commerce-related ticker data). In one embodiment, the ticker data from the data feeds 200 comprises "raw" unformatted data (e.g., data with minimal or no formatting or graphics).

The raw ticker data is provided to a feed server 202. In an embodiment, the feed server 202 operates as a content aggregator that pulls or otherwise receives the raw ticker data from the data feeds 200. The feed server 202 also performs data manipulation on the received ticker data to manipulate the data into a database format so that the data can be indexed and stored. A feed engine 204, which can be embodied in software or other machine-readable instructions stored on one or more machine-readable media according to an embodiment, can reside and run in the feed server 202 to perform at least some of this data manipulation.

The feed server 202 is coupled to provide the manipulated ticker data to a production server 206. The production server 206 includes or is otherwise coupled to a database 208. The feed engine 204 calls on the database 208, and instructs the database 208 where to place the various ticker data. For example, the database 208 can include a plurality of database code objects 210 that cooperate with ticker tables 212 (such as a sports table 214, a weather table 216, and so forth) to index or store ticker data. The feed engine 204 calls the database 208 and identifies the database code objects and ticker tables where the ticker data is to be stored.

The various components of the database 208, such as the ticker tables 212, can also be configured in a manner that optimizes the organization and distribution of the ticker data. For example, ticker data unique to various geographic regions can be segregated from or otherwise identifiable from each other, so that ticker data that is relevant to only particular client terminals 108 need not be broadcast to all client terminals. For instance, California weather information can be segregated from Oregon weather information in the database 208 in a manner that client terminals 108 of California users do not receive Oregon weather information, unless specifically requested. This feature improves transmission efficiency and transmission time, since the bandwidth of communication paths to certain client terminals 108 are not clogged by non-relevant ticker data.

In an embodiment, the production server 206 can also perform data manipulation, such as before the data is stored in the database 208, while it is stored in the database 208, or after the data is retrieved from the database 208 for transmission to client terminals 108. For instance, the production server 206 can perform data manipulation to place the ticker data into a format that is "consumable" or otherwise compatible with operating software of the client terminals 108. For instance, the production server 206 can place the ticker data into formats such as hypertext markup language (HTML), extensible markup language (XML), or other suitable formats.

The production server 206 is coupled to provide ticker data from the database 208 to one or more distribution servers 218, which may be located in or otherwise communicatively coupled to a distribution center 106 (such as a head-end). The distribution server 218 operates to provide the ticker data to the client terminals 108 via several possible communication paths or channels, as will be described with reference to FIG. 3.

It is to be appreciated that the components shown in FIG. 2 are merely illustrative of the various components of one embodiment that can be used to provide ticker information. For example, other embodiments can use more or fewer servers, as well as different components, to perform the various operations. Moreover, the various servers and their components (such as the feed engine 204 and the database 208) can be distributed elsewhere in the system 100, instead of or in addition to the locations shown in FIG. 2. There may be multiple feed servers 202, production servers 206 and databases 208, distribution servers 218, and so on to account for load balancing, redundancy in case of outages or broken connections, and other factors that can affect distribution of ticker information.

Figure 3:
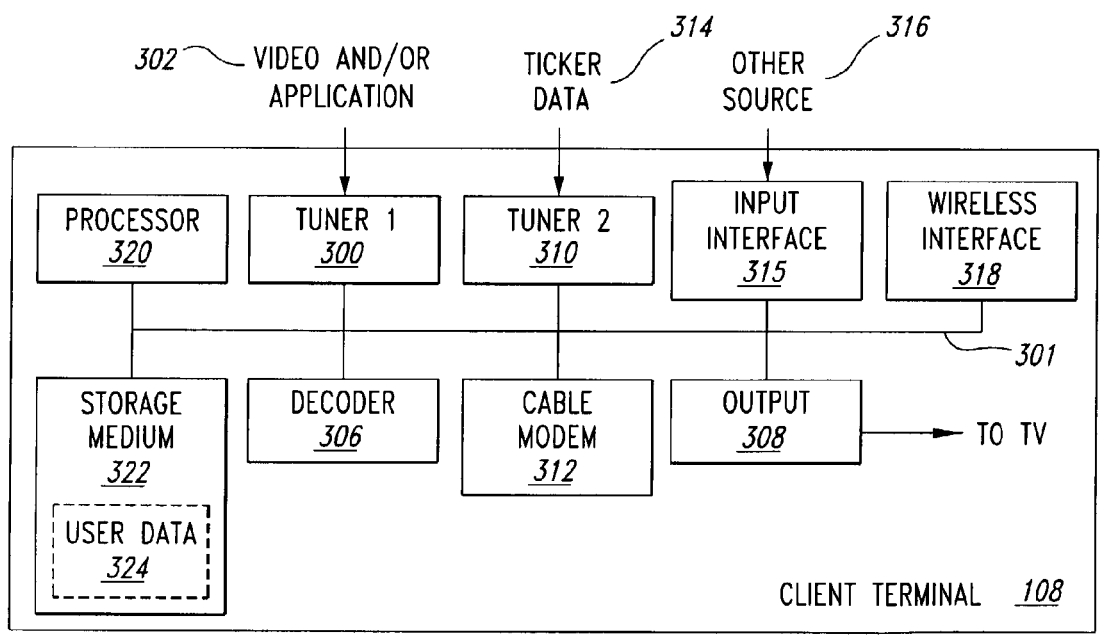
FIG. 3 is a block diagram of an embodiment of a client terminal that can be used in the system of FIG. 1 to present a ticker.

FIG. 3 is a block diagram of an embodiment of a client terminal 108 for the system 100 of FIG. 1 that can implement an embodiment of the invention to present a ticker through which a viewer can perform secure transactions. For the sake of simplicity of illustration and explanation, only the components that are germane to understanding an embodiment of the invention are shown in FIG. 3. It is understood that the embodiment of the client terminal 108 shown in FIG. 3 can have other components different than or in addition to what is shown. Moreover, the various illustrated components may be suitably combined in some embodiments, instead of being separate. It also should be noted that the client terminal 108 is only one embodiment of the invention and that some or all of the components described as embodied in the client terminal 108 can be incorporated into a client television rather than in a separate device. A bus 301 is shown symbolically to depict coupling between the various components.

To briefly describe an embodiment, the client terminal 108 receives ticker data and advertisement data from the distribution server 218 or other sources, and then performs the appropriate processing of the data to allow the data to be displayed in a ticker on a display screen of a television set. The client terminal 108 can be passive in that it receives the ticker data (as well as updates) and when the data is sent by the distribution server 218, independently of whether the client terminal 108 requested the ticker data (e.g., the distribution server 218 "pushes" the data to client terminals 108). Alternatively or in addition, the client terminal 108 can poll or otherwise explicitly request the data from the distribution server 218, including polling the distribution server 218 for updated data (e.g., the client terminal 108 "pulls" the data from the distribution server 218). In some embodiments, both push and pull mechanisms may be involved.

Once it receives the ticker data from the distribution server 218, the data can be buffered or cached (if appropriate), and processed for presentation on the display screen of the television set. In an embodiment, ticker software in the client terminal 108 can work in conjunction with a ticker template or other ticker user interface to display the ticker (and its ticker items) in the appropriate scrolling layout, format, locations, time intervals, topics, content, and so forth. In one embodiment where the ticker data is obtained from the Internet 102, this ticker software can comprise browser-based software or other software capable to cooperate with a web browser. According to various embodiments, the ticker can be generated and made interactive through Flash, C++, Java, HTML, or other suitable code or software.

The client terminal 108 comprises a first tuner 300 to tune to a Moving Pictures Experts Group (MPEG) stream 302 or other video source. The stream 302 may include video, live transmission, and/or application code, including corresponding text and graphic resources. In an embodiment where tickers are provided in an integrated manner along with the video signal, the ticker can be received by way of the stream 302. One skilled in the art will recognize that there will be a plurality of streams 302, depending on the number of channels and programs that the cable service provider makes available to the client terminal 108.

The first tuner 300 is coupled to a decoder 306 that decodes the video, application, and/or audio into a format that is compatible with a television set coupled to the client terminal 108. The client terminal 108 may include a second tuner 310. The second tuner 310 can work in conjunction with a cable modem 312 to obtain ticker data 314 from the Internet 102, such as via a Data Over Cable Service Interface Specifications (DOCSIS) connection with the distribution server 218. In addition to the ticker data 314, advertisements and Internet content can also be received by the client terminal 108 by way of the DOCSIS connection through the second tuner 310 and the cable modem 312. In one embodiment, the second tuner 310 can be used to obtain such advertisement data from a server (such as that used by a merchant or advertiser), remote database, Internet location or web site, or other source depicted in FIG. 1.

In addition, the client terminal 108 includes or is coupled to an input interface 315, through which other sources 316 of ticker data (including advertising data) can be provided to the client terminal 108. An example of the input interface 315 comprises an out-of-band tuner that can be used to tune to ticker data or advertisements that are provided via an out-of-band channel. In an embodiment, the out-of-band channel(s) can comprise one or more low-bandwidth frequencies carried on the same coaxial cable used to provide the MPEG streams and the Internet content. The out-of-band channel(s) tuned to by the input interface 315 to receive ticker data or advertisements can be used alternatively or in addition to the DOCSIS channel tuned to by the second tuner 310 in such an embodiment. In one embodiment, secure user transactions or other responses in response to information displayed in a ticker may be communicated to and from the client terminal 108 via the input interface 315 or the second tuner 310.

Further alternatively or in addition, the input interface 315 can comprise another television broadcast tuner (such as the first tuner 300) to tune to one or more channels that may be carrying ticker data or advertisements. For example, ticker data (including updates) and advertisements may be broadcast in one or more channel frequencies specifically dedicated for transmission of such data to client terminals 108. Thus, as an illustration, the first tuner 300 can tune to a channel showing a television program, while the input interface 315 is tuned to receive data (in the form of packets, for example) from a ticker channel or shopping channel (or merchant channel or other synthetic channel accessible through a network address) to allow a ticker having advertising information therein to be simultaneously shown on the same television screen as the television program.

Yet another example of the input interface 315 is an interface to receive outputs of recording devices such as a PVR or a digital video recorder (DVR) that may have ticker data (including advertising information), which may be received via download. Alternatively or in addition, the input interface 315 can comprise a communication interface, such as an Ethernet connection, a digital subscriber line modem, a wireless communication interface, and so forth, which can provide a link to the server 218 to receive ticker data and advertisements, for instance.

An embodiment of the client terminal 108 may include a processor 320 to control operation of the various components shown in FIG. 3. The processor 320 may work in conjunction with ticker software or other machine-readable instructions stored on at least one machine-readable storage medium 322. Such ticker software may cooperate with the processor 320 to present ticker data in a ticker template or other screen interface or user interface, establish a secure communication conducted through the ticker, configure the format and layout of the ticker displayed on the display screen of the television, format an advertisement or other ticker information for a ticker, process received user commands related to responding to information presented in the ticker or performing other transactions, and other operations. In an embodiment, the ticker software can be pre-installed in the client terminal 108. In another embodiment, the ticker software may be installed by way of download from the system 100.

An audio and video output subsection 308 of the client terminal 108 receives decoded video and/or other applications (including ticker templates and the ticker data presented therein), and provides the decoded information to a television set. A wireless interface 318 operates to receive commands from a user input device (such as a wireless remote control). Such commands can include user commands related to interaction with the ticker in an embodiment. The wireless interface 318 provides these commands to the processor 320 so that the processor 320 can cooperate with the ticker software to perform the corresponding operation.

In an embodiment of the invention, the storage medium 322 can also store user data 324 related to operation of the ticker. For instance, the user data 324 can include user settings for the ticker (such as location, font size, topics or other subject matter displayed, and others). In any of these storage locations, multiple sets of user data 324 may be stored, such as in implementations where multiple users in a household log into a same client terminal 108. According to one embodiment, one or more personal identification numbers (PINs), passwords, or other security data may be stored as the user data 324, and automatically retrieved from the storage medium 322 during the course of performing a secure transaction within the ticker.

The storage medium 322 can include cache(s), buffer(s), or other types of storage locations where ticker data, advertisements, or other information may be stored. For example, received sports scores can be stored in the storage medium and retrieved during the appropriate times during the course of the scrolling of the ticker. The ticker data stored in the storage medium 322 can be replaced as updates are received from the distribution server 218. In one embodiment, less time-dependent ticker information (e.g., information that need not necessarily be updated several times per day), including graphics for weather displays, game schedules, some types of advertisements, and the like, can be downloaded to the storage medium 322 during non-peak television viewing periods (such as late at night), and then retrieved from the storage medium 322 when that piece of information is appropriate for presentation in the ticker.

Figure 4:
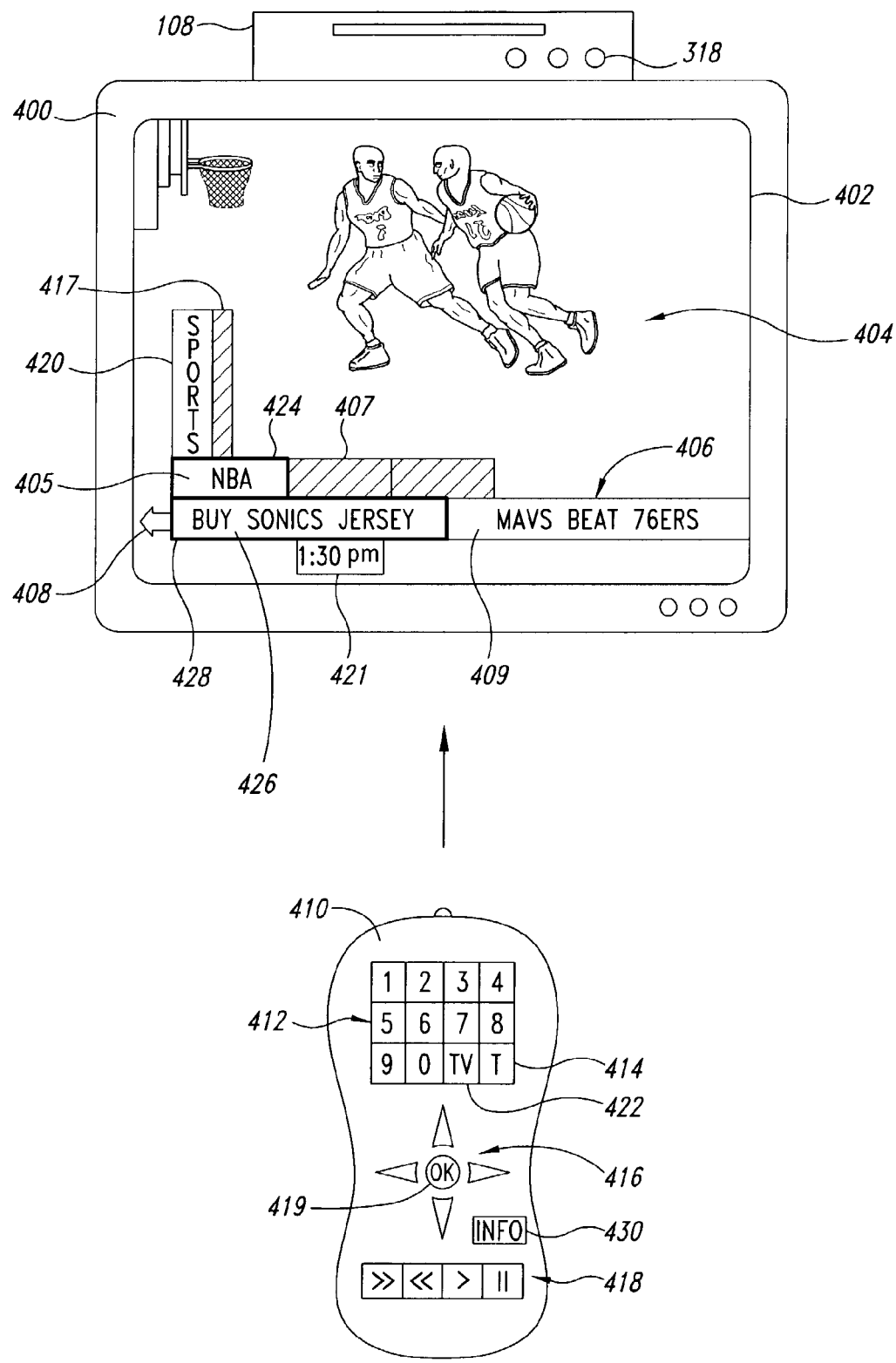
FIG. 4 is an example screen shot in conjunction with a remote control for implementing one embodiment of the invention.
Figure 5:
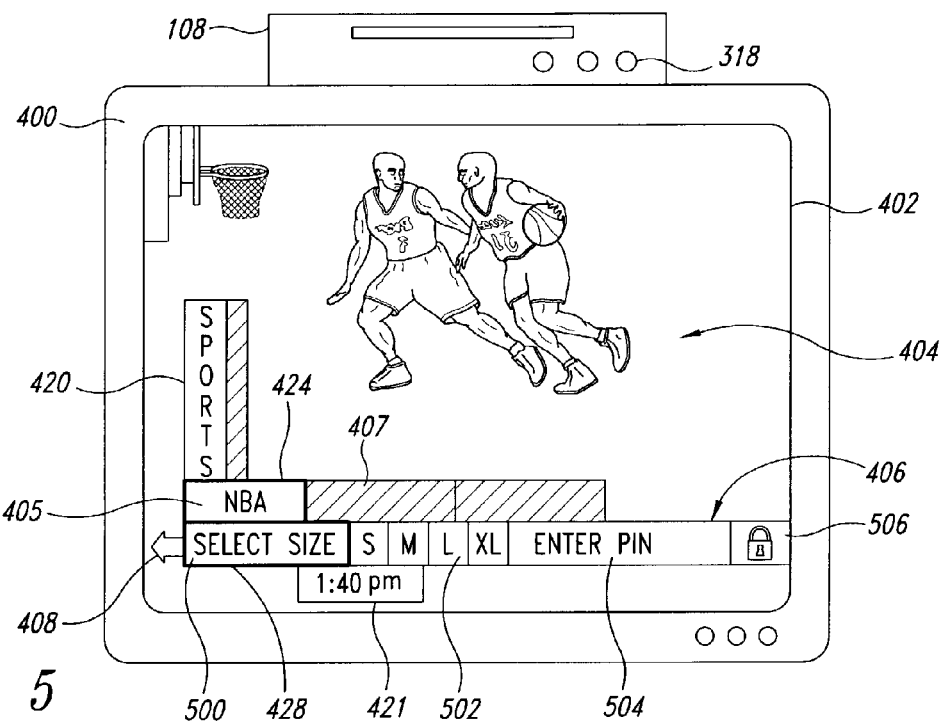
FIGS. 5-6 are screen shots depicting secure transactions via a ticker in accordance with various embodiments of the invention.
Figure 6:
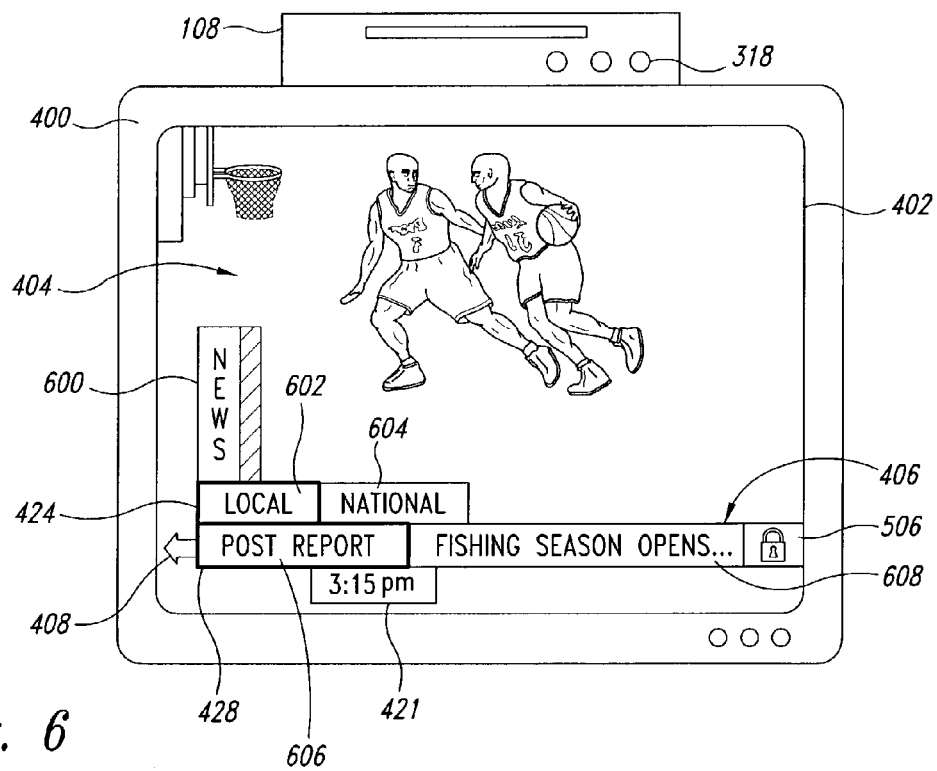

FIGS. 4-6 are television screen shots depicting operation of a ticker having advertisements or other information, in response to which a viewer can perform a secure transaction in accordance with various embodiments of the invention. For simplicity of explanation, not all of the possible types of advertisements (or other information) and related transactions are shown or described, as such other possible information can be ascertained by examination of the features specifically shown in FIGS. 4-6. Moreover, it is to be appreciated that the format, layout, direction, content, and other characteristics of the ticker shown in FIGS. 4-6 are merely illustrative and that variations are possible. Also, one embodiment of the invention can allow a viewer to perform a secure transaction within the ticker (such as depicted in FIG. 6), with the transaction not being necessarily commercial in nature or in response to an advertisement.

In FIG. 4, a television set 400 is coupled to the client terminal 108 in a manner that allows a display screen 402 of the television set to show a television program 404. The television program 404 in this example is a basketball game. A ticker 406 is shown scrolling across the bottom of the display screen 402. The ticker 406 can be in a screen interface that overlays the television program 404, or the television program 404 may be scaled appropriately on the display screen 402 to fit the screen interface for the ticker 406 and thereby avoid the need for an overlay. An embodiment of the ticker 406 displays the current time 421.

In the example of the ticker 406, the ticker 406 is scrolling from right to left (as symbolically depicted by an arrow 408). It is to be appreciated that in other embodiments, the ticker 406 may be scrolling in different directions and may also be positioned differently on the display screen 402. For the sake of illustration, the ticker 406 is shown as being set in a cycle where it is presenting NBA™ basketball news (e.g., "Mavs beat 76ers" is a moving ticker text item 409 that is being displayed in a scroll region for a "Sports" category 420 and an NBA™ subcategory 405). There may be any suitable number of categories 417 and subcategories 407 through which the user can navigate. A navigation control 424, such as a stationary center focus box or movable selection rectangle, can be used to make navigation selections. It is appreciated that advertisements can be presented under other categories 417, such as a "Shopping" category.

FIG. 4 illustrates one embodiment where an advertisement 426 in the ticker 406 is directly related to or otherwise in context with the television program 404. More specifically, assuming that the television program 404 is a live Sonics basketball game, the advertisement 426 can present a purchase opportunity that is directly related to the subject matter of the television program (e.g., an advertisement to purchase a Sonics jersey in this example). A suitable technique to select and present advertisements in a ticker that are in context with a television program, via the use of triggers in one embodiment, are disclosed in U.S. application Ser. No. 10/112,071, entitled "AUTOMATIC ADVERTISEMENT INSERTION INTO AN INTERACTIVE TELEVISION TICKER," filed Mar. 28, 2002, with inventor Thomas P. McKenna, Jr., assigned to the same assignee as the present application, and incorporated herein by reference in its entirety. This copending application further discloses techniques to present advertisements in a ticker that are not necessarily in context with subject matter of a current television program.

It is appreciated that in one embodiment, a purchase opportunity can be presented as auction items rather than just advertisements. A viewer can be presented with auction items (like sports memorabilia) while watching a baseball game, for instance.

When the advertisement 426 scrolls into a center focus box 428, the viewer can then press an INFO button 430 on a user input device (such as wireless remote control 410) so as to view additional details of the advertisement 426 for purposes of beginning a purchase transaction. Alternatively or in addition, the viewer can press a "BUY" button (not shown) or other button(s) on the remote control 410 to view additional information. In one embodiment, responding to the advertisement 426 in this manner results in access of additional information via a hyperlink or other link (which may include channel tuning).

The wireless remote control 410 is in communication with the client terminal 108 (via the wireless interface 318) to perform conventional television-viewing operations and also to control operation of the ticker 406 according to an embodiment of the invention, including operations associated with selection of an advertisement for a transaction and the resulting secure interaction. The remote control 410 includes an alphanumeric keypad 412 that the viewer can use to select television channels or to conduct a transaction according to one embodiment (such as making menu selections of advertised products, entering a PIN, and the like). Buttons 418 can comprise buttons that are similar to play, rewind, fast forward, pause, etc. buttons usable for recording devices or for ticker operations. In an embodiment, the remote control 410 can include a ticker button 414, which if pressed, causes a command to be sent to the client terminal 108 to instruct the ticker software to render the ticker 406 on the display screen 402. If the ticker button 414 is pressed again, the ticker 406 is taken off the display screen 402. Alternatively or in addition, a TV button 422 can be pressed to dismiss the ticker 406. It is appreciated that other techniques may be used to invoke the ticker 406.

FIG. 5 illustrates an example when the viewer has clicked the INFO button 430 (or the OK button 419) after the advertisement 426 has scrolled into the center focus box 428. The viewer may have performed this action to view additional information about the advertised product, to actually buy it, or both. In an embodiment, the ticker 406 scrolls transaction information within its scroll region so that the viewer can perform the transaction within the ticker, as opposed to launching a separate window or web page.

In one embodiment, a secure icon 506 is displayed in the ticker 406 once the viewer responds to the advertisement 426 by clicking the INFO button 430. Presentation of the secure icon 506 in this manner provides a visual indication to the viewer that a secure connection has been established and that the subsequent transaction activities will be conducted securely via encryption or other suitable security techniques that would be familiar to those skilled in the art having the benefit of this disclosure. Examples of security technology that may be used by various embodiments include, but are not limited to, hypertext transfer protocol secure (https), secure sockets layer (SSL), RSA encryption, public key infrastructure (PKI), or others or any combination thereof. Moreover, it is to be appreciated that the secure icon 506 need not necessarily be rendered immediately after the viewer clicks the advertisement 426. For instance, a secure connection may be established only when sensitive information (such as viewer identification data) is actually being exchanged, and not when the viewer is merely requesting and perusing informational product data.

To illustrate an embodiment where the viewer can perform a secure transaction within the ticker 406, ticker items can scroll that prompt the viewer to make selections, such as a "Select Size" ticker item 500 to alert the viewer to select a size for the desired jersey. The Select Size ticker item 500 is followed by sizes that the viewer can select, which are represented as individually selectable ticker items 502 for small, medium, large, and extra large. When the appropriate size has scrolled into the center focus box 428, the viewer can press the OK button 419 to make the selection. Similar other selections (not shown) can be scrolled by the ticker 406, such as color, quantity, other products, and so forth. These items may be selected when they scroll into the center focus box 428, navigated to via a selection rectangle used in conjunction with the arrow keys 416, selected from a list by pressing the alphanumeric key(s) 412 to enter a number corresponding to a selection number in the list, selected from a drop-down menu, or via some other suitable selection technique.

Alternatively or in addition, a text entry tool can be provided if necessary for text entry of information such as address, credit card number, name, monogram, messages, remarks, etc., if such information is needed for the transaction. For instance, the ticker 405 might scroll an item 504 prompting the viewer to enter a personal identification number (PIN). Once the item 504 comes into center focus, the viewer can then press the OK button 419 and the appropriate alphanumeric keys 412 on the remote control 410 (or on an on-screen menu) to enter the PIN. The PIN may or may not be displayed within the scroll region of the ticker 406 as it is entered. The PIN may be stored in a smart card accessible by the ticker, according to one embodiment. Once obtained, the PIN can be used to identify the viewer, his address, credit card, etc. While entering the PIN and conducting other sensitive transaction activities, the secure icon 506 can remain rendered to assure the viewer of the secured nature of the transaction (e.g., the entered PIN is being encrypted).

According to various embodiments, the PIN may be associated with an account with a particular merchant. The PIN may also be associated with a service-wide wallet that is usable for one or more merchants who are contracted to provide goods and services to ticker subscribers/viewers. It is appreciated that alternatively or in addition to a PIN, the viewer can enter other identifying information, such as passwords, names, addresses, account numbers, and so forth.

After the viewer has responded to all of the items scrolled by the ticker 406 that require a response, the encrypted viewer-entered information is sent to the merchant or other party that processes the transaction. The ticker 406 can then continue to scroll additional advertisements, in the event that the viewer wishes to make additional purchases or continue perusing advertised products. Accordingly, as shown and described above, providing the capability to present advertisements within the ticker 406 and the capability to conduct the resulting transaction within the ticker 406 securely results in little or no interruption of the television program 404, since the ticker only occupies a minority portion of the display screen 402.

FIG. 6 illustrates an example when the viewer performs a secure transaction that is not necessarily commercial in nature, such as posting of a message. In FIG. 6, the ticker 406 is scrolling headlines from a news category 600 while the basketball television program 404 is playing (e.g., the ticker 406 is scrolling ticker items unrelated to the television program 404). Since the navigational control 424 is positioned on a "Local" news subcategory 602, the ticker 406 currently scrolls a local headline 608 related to fishing. Once local headlines finish scrolling, the ticker 406 may scroll national headlines from a "National" news subcategory 604.

An interactive prompt 606 is scrolled by the ticker 406 to notify the viewer that the viewer can post a fishing report. Once the interactive prompt 606 scrolls into the center focus box 428, the viewer can press the OK button 419 on the remote control 410 to enter a secure mode for a transaction of information (e.g., so that only subscribers, friends, or other authorized recipients will be able to decrypt the information). The secure icon 506 is displayed when the secure mode is entered, and then the viewer can post a report detailing the date, time, place, and summary of a recent fishing trip, for instance. This information can be entered by the viewer within the scroll region of the ticker 406, using buttons of the remote control 410 to enter alphanumeric text, selection of "canned" messages from a menu scrolled by the ticker 406, on-screen keypads, or other techniques. The entered information is encrypted prior to transmission, thereby assuring substantially secure communication.

Figure 7:
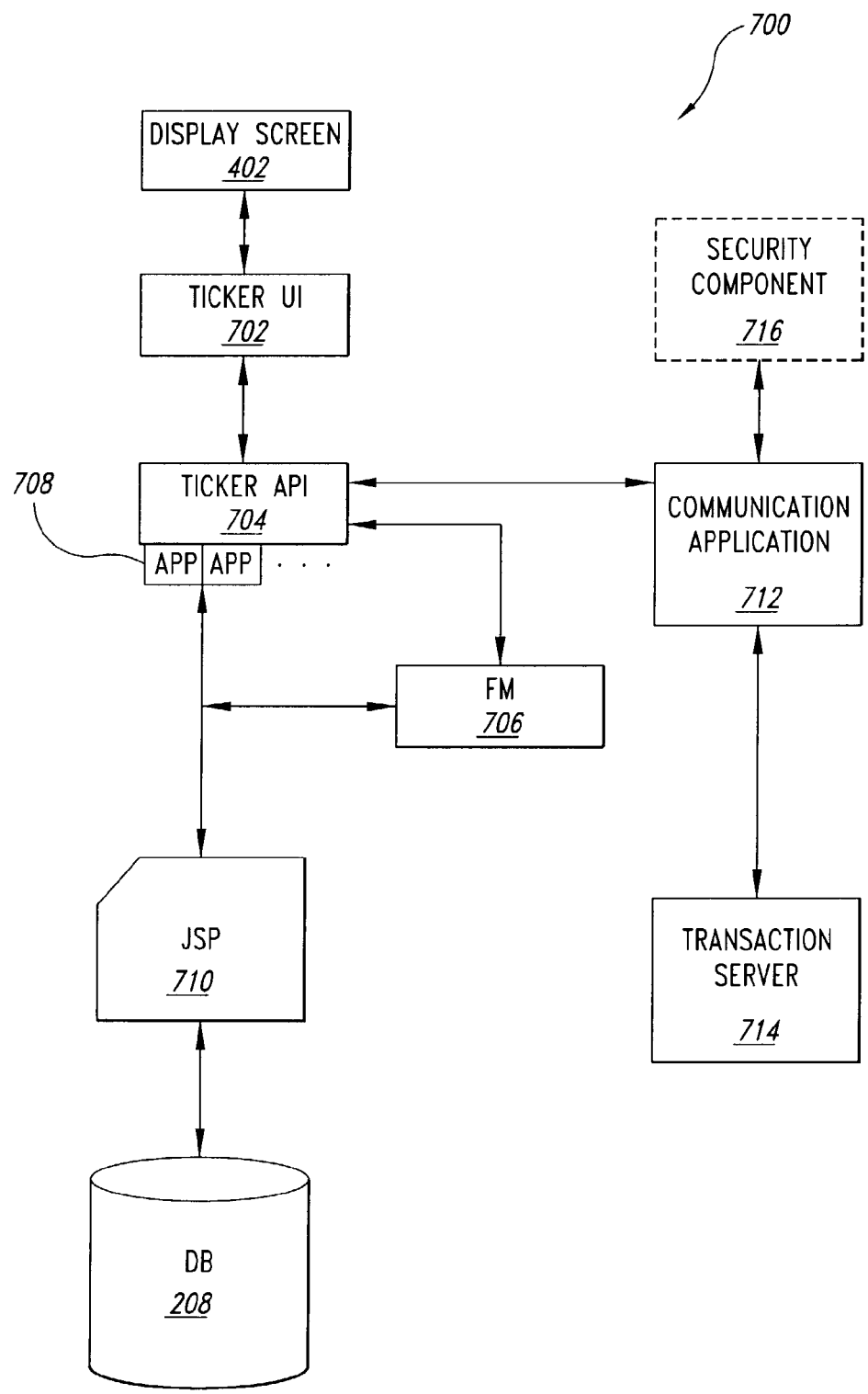
FIG. 7 is a block diagram illustrating components that can interact to provide secure transactions via a ticker according to an embodiment of the invention.

FIG. 7 is a block diagram 700 illustrating components that can interact to present information, including advertisements and transactional data for a secure communication, in the ticker 406 according to an embodiment of the invention. At least some of the components of FIG. 7 can be embodied in software or other machine-readable instruction stored on a machine-readable medium, such as the storage medium 322. An embodiment of the ticker software includes a ticker user interface (UI) 702 that presents the ticker 406 on the display screen 402, as well as being able to receive and process viewer responses. A ticker application program interface (API) 704 interacts with the ticker UI 702 to control what the ticker UI displays, how to display, when to display, and so forth. In an embodiment, the ticker API 704 provides data to the ticker UI 702, as well as processing user commands that interact with the ticker 406 during transactions (if necessary) and that are entered via the ticker UI 702 (such as PINs, menu selections, alphanumeric entries, and so forth).

The ticker API 704 interfaces with a plurality of applications 708. These applications can include a sports application, news application, weather application, or other applications associated with categories that the ticker 406 can present to the viewer. A feed manager (FM) 706 (or other software controller) operates to determine when new or updated ticker information is present and needs to be provided to the ticker API 704. To obtain new ticker data, in an embodiment, the application(s) 708 calls a Java server page (JSP) 710 at a web server (which may be located at the distribution server 218). Java objects at the web server will then communicate with the database 208 to obtain the appropriate ticker information.

It is appreciated that some embodiments need not necessarily implement an API to integrate ticker functionality. In such embodiments, at least some of the ticker functionality can be coded into an operating system without use of an API. For the sake of brevity, specific details regarding operation of the various components shown in FIG. 7 to present ticker data (including advertisements with links) in the ticker 406 (as well as updates) are not provided herein, since such operational details are ancillary to the security features of the present application. Example details of operation can be obtained from the copending U.S. patent application Ser. No. 10/112,071 identified above, or from copending U.S. patent application Ser. No. 10/112,580, entitled "MODULE-BASED INTERACTIVE TELEVISION TICKER," filed Mar. 29, 2002, with inventor Paul G. Allen, assigned to the same assignee as the present application, and incorporated herein by reference in its entirety.

In one embodiment, one of the applications 708 integrated with the ticker software can comprise a security application that performs encryption or other security-related operations. When a secure connection is to be established and maintained for a transaction, the ticker API 704 can call this security application 708. The security application 708 then operates in conjunction with a communication application 712 to establish a secure connection with a transaction server 714 or other remote location. The transaction server 714 can comprise, for instance, a merchant's server, a server for a synthetic shopping channel (e.g., an interactive channel provided by the interactive service provider as part of a channel lineup, such as via tuning to a URL or other network address), or other component depicted in FIG. 1 or 2 where a viewer can exchange information as part of a secure transaction.

The security application 708 can perform subsequent operations such as encrypting viewer responses to be sent to the transaction server 714, and decrypting information sent from the transaction server 714 so that the decrypted information can be intelligently displayed by the ticker UI 702 in the ticker 406. Examples of the communication application 712 can include browsers, modem applications, or other suitable communication hardware or software that can communicate with the transaction server 714 to perform a transaction (commercial or non-commercial) and that would be familiar to those skilled in the art having the benefit of this disclosure.

In another embodiment, the ticker software (such as the ticker API 704 portion) can interact with a separate security application or other security component 716 that is not integrated within the ticker software. For instance in one implementation, the security component 716 can comprise part of the communication application 712 (as depicted symbolically by broken lines in FIG. 7), with which the ticker API 704 can communicate. In other implementations, the security component 716 can operate as a proxy that is separate from the communication application 712. The security component 716 can perform the security-related operations of establishing a secure connection with the transaction server 714, encryption, decryption, and so forth.

In yet another embodiment, the security application 708 can comprise a separate application in FIG. 7, and the ticker UI 702 interfaces directly with it (e.g., the ticker UI 702 interfaces with the security application 708, which interfaces with the communication application 712). The ticker API 704 essentially converts from a pull model to a push—it pulls data from a server, and pushes data to the ticker UI 702. The various application components under the ticker API 704 are only used as an interface to the raw data on the server. Therefore, the ticker API 704 provides an advertisement to the ticker UI 702, which would present the advertisement. The ticker UI 702 handles user interaction, and interface with the security application 708, which then would use the communication application 712 (or security component 716, if necessary).

In an embodiment, the ticker API 704 formats the data to be provided to the ticker UI 702, including advertisement data, in a manner that the viewer can interact with the advertisement at the ticker UI 702 level for interactive transactional purposes within the ticker 406 itself. For example, the ticker API 704 can format the ticker data to provide such data with hypertext links or with other links to additional product information or to a merchant website. This formatting may include defining objects or functions that link to such advertising information. The ticker UI 702 can also capture viewer responses (such as key presses from the remote control 410), and then convert or translate these viewer responses into data that can be encrypted and sent to the transaction server 714. Macromedia Flash can be used in one embodiment to provide the transactional interactivity within the ticker interface, for instance.

Figure 8:
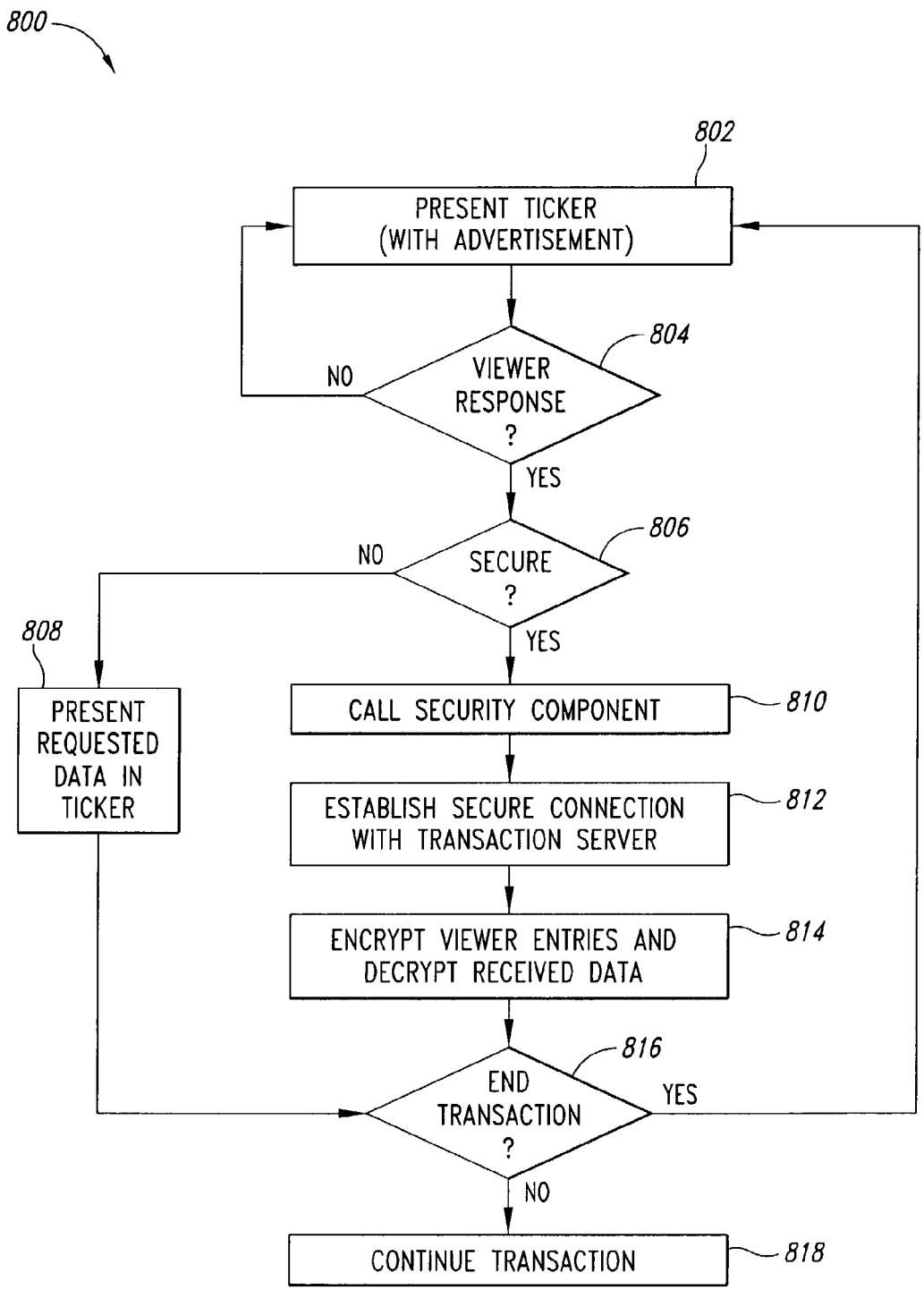
FIG. 8 is a flowchart illustrating operation of a ticker to provide a secure transaction according to an embodiment of the invention.

FIG. 8 is a flowchart 800 illustrating operation of the ticker 406 to provide a secure transaction according to an embodiment of the invention. Elements of the flowchart 800 may be embodied in software or other machine-readable instruction stored on a machine-readable medium, such as the storage medium 322. Moreover, operations shown in the flowchart 800 need not necessarily occur in the exact order shown.

Beginning at a block 802, the ticker 406 is presented on the display screen 402 (such as after the ticker 406 is invoked via a press of the ticker button 414 on the remote control 410). The ticker 406 may be concurrently presented with the television program 404, and may have the advertisement 426 or other ticker data presented therein.

At a block 804, the ticker UI 702 monitors for a viewer response. A viewer response can include clicking on the advertisement 426 when it scrolls into the center focus box 428, when the viewer wishes to make a purchase or obtain more information about the advertised product. If no viewer response is detected at the block 804, then the ticker continues to present data at the block 802.

If, however, a viewer response is detected at the block 804 by the ticker UI 702, then it is determined at a block 806 whether a secure communication is needed. Various techniques may be used to determine if a secure communication is needed. In one embodiment, simply responding to an advertisement automatically necessitates establishment of a secure connection. In other embodiments, a suitable one of the components shown in FIG. 7 (such as the ticker UI 702, the ticker API 704, an application 708, a browser, web page HTML code or other code, and so forth) can determine whether initiating a secure connection is necessary for the particular situation. For instance, if the viewer is simply requesting display of general information about an advertised product in the ticker 406, then a secure connection need not necessarily be established to encrypt the viewer request and the requested data—the requested data can be presented in the ticker 406 at a block 808 without any encryption or other security measures. In one embodiment, the content itself could contain either the logic or properties to determine if a secure connection is required. For example, an advertisement for a free sample would not need a secure connection, but an advertisement for a purchase of the same product would. That type of logic is not normally coded into the components, but instead can be provided as part of the content in an embodiment.

If, however, it is determined that a secure connection needs to be established, then the ticker API 704 in one embodiment calls the security application 708 or the security component 716 at a block 810 (or the ticker UI 702 interfaces directly with the security application 708 or the security component, in another embodiment). The security application 708 or the security component 716 (through the communication application 712, as needed) then contacts the transaction server 714 at a block 812 to establish the secure connection, based on protocols and algorithms that would be familiar to those skilled in the art having the benefit of this disclosure.

Once the secure connection is established at the block 812, then the security application 708 or the security component 716 can encrypt information sent from the viewer to the transaction server 714, or decrypt information sent from the transaction server 714 at a block 814. If it is determined that the transaction is finished (such as when the viewer has entered all information necessary to complete a purchase) at a block 816, then the flowchart 800 resumes presentation of ticker data at the block 802. Otherwise, the transaction continues at a block 818 in either a secure or non-secure mode.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention and can be made without deviating from the spirit and scope of the invention.

As an example, a satellite television (TV) delivery system may be implemented alternatively or in addition to a cable distribution system. A satellite TV delivery system may comprise a direct broadcast satellite (DBS) system. A DBS system may comprise a small 18-inch satellite dish (which is an antenna for receiving a satellite broadcast signal); a digital integrated receiver/decoder (IRD), which separates each channel, and decompresses and translates the digital signal so a television can show it; and a remote control. Programming for a DBS system may be distributed, for example, by multiple high-power satellites in geosynchronous orbit, each with multiple transponders. Compression (e.g., MPEG) is used to increase the amount of programming that can be transmitted in the available bandwidth.

A digital broadcast center (e.g., analogous to the head-end 106) may be used to gather programming content, ensure its digital quality, and transmit the signal up to the satellites. Programming may come to the broadcast center from content providers (TBS™, HBO™, CNN™, ESPN™, etc.) via satellite, fiber optic cable, and/or special digital tape. Satellite-delivered programming is typically immediately digitized, encrypted and uplinked to the orbiting satellites. The satellites retransmit the signal back down to every earthstation—or, in other words, every compatible DBS system receiver dish at customers' homes and businesses.

Some programs may be recorded on digital videotape in the broadcast center to be broadcast later. Before any recorded programs are viewed by customers, technicians may use post-production equipment to view and analyze each tape to ensure audio and video quality. Tapes may then be loaded into a robotic tape handling system, and playback may be triggered by a computerized signal sent from a broadcast automation system. Back-up videotape playback equipment may ensure uninterrupted transmission when appropriate.

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

What is claimed is:

1. A method, comprising:

presenting a ticker having a screen interface on a portion of a display screen capable to display a television program, the ticker comprising a focus area and a plurality of advertisements being automatically scrolled into and out of the focus area, the ticker further comprising a ticker user interface (UI) to generate the focus area and a scroll region that presents the plurality of advertisements and to provide a navigation control to select that advertisement presented within the scroll region;

a ticker application program interface (API) in communication with the ticker UI to control presentation of a security indicator by the ticker UI and to provide the plurality of advertisements to the ticker UI; and a security application in communication with the ticker API to establish a secure connection between the ticker API and a remote location, the security application being configured to instruct the ticker API to control the ticker UI to present the security indicator if the secure connection is established, the security application further being configured to encrypt and decrypt information exchanged between the ticker API and the remote location;

automatically scrolling an advertisement for an item into the focus area of the ticker;

if a user responds to the advertisement by activating a specifically-designated control on a user input device when the advertisement is within the focus area, initiating a transaction related to the item with the user within the screen interface of the ticker; and securely conducting at least a portion of the transaction with the user within the screen interface of the ticker.

2. The method of claim 1 wherein presenting the ticker comprises superimposing the ticker over a portion of a full-screen presentation of the television program, the full-screen presentation filling substantially all of the display screen.

3. The method of claim 1 further comprising displaying the security indicator in connection with the ticker immediately upon the user responding to the advertisement to indicate that at least the portion of the transaction is secure, wherein the security indicator persists throughout the transaction.

4. The method of claim 1 wherein presenting a ticker comprises presenting the ticker along a bottom portion of the display screen concurrently with a substantially full-screen presentation of the television program on the remainder of the display screen.

5. The method of claim 1 wherein securely conducting at least the portion of the transaction with the user includes:

establishing the secure connection with the remote location;

encrypting data entered by the user and sending the encrypted data to the remote location; and decrypting data received from the remote location and presenting the decrypted data within the screen interface of the ticker.

6. The method of claim 5, further comprising determining whether at least another portion of the transaction needs to be securely conducted.

7. The method of claim 5, further comprising calling a secure component separate from software of the ticker to allow the ticker to enter a secure mode.

8. The method of claim 1, wherein automatically scrolling comprises horizontally scrolling the advertisement into the focus area.

9. The method of claim 1, wherein automatically scrolling comprises vertically scrolling the advertisement into the focus area.

10. The method of claim 1, wherein the entire transaction is conducted within the screen interface of the ticker.

11. The method of claim 1, further comprising providing additional information about the item when the user responds to the advertisement.

12. The method of claim 1, further comprising making a selection, within the screen interface, regarding an attribute of the item from a plurality of choices while conducting the transaction.

13. The method of claim 1, further comprising providing a text entry, within the screen interface, of information while conducting the transaction.

14. The method of claim 1, wherein the ticker only scrolls advertisements, and information regarding the advertised items, through the focus area.

15. An article of manufacture, comprising:

a computer-readable medium having instructions stored thereon to:

display a ticker having a screen interface with a full-screen presentation of a television program filling substantially all of a television display screen, the ticker comprising a ticker user interface (UI) to generate a focus area and a scroll region for presentation of advertisements and to provide a navigation control to select that advertisement presented within the scroll region;

a ticker application program interface (API) in communication with the ticker UI to control presentation of a security indicator by the ticker UI and to provide the advertisements to the ticker UI; and a security application in communication with the ticker API to establish a secure connection between the ticker API and a remote location, the security application being configured to instruct the ticker API to control the ticker UI to present the security indicator if the secure connection is established, the security application further being configured to encrypt and decrypt information exchanged between the ticker API and the remote location;

present an advertisement for a product within the screen interface of the ticker by automatically scrolling the advertisement through he scroll region of the ticker;

responsive to a user activating a specifically-designated button on a user input device, initiate a transaction related to the presented advertisement within the screen interface of the ticker;

presenting the security indicator along with the ticker immediately upon activation of the specifically-designated button to indicate that the transaction will be secure, wherein the security indicator persists throughout the transaction; and securely conducting at least a portion of the transaction within the screen interface of the ticker.

16. The article of manufacture of claim 15 wherein the computer-readable medium further includes instructions stored thereon to display the focus area within the ticker and scroll advertisements into and out of the focus area.

17. The article of manufacture of claim 15 wherein the instructions to securely conduct at least a portion of the transaction within the screen interface of the ticker include instructions to:

establish the secure connection with the remote location;

encrypt user-entered data and send the encrypted data to the remote location; and decrypt data received from the remote location and present the decrypted data within the screen interface of the ticker.

18. The article of manufacture of claim 17 wherein the instructions to securely conduct at least a portion of the transaction within the screen interface of the ticker further include instructions to call a secure component separate from the ticker to allow the ticker to enter a secure mode.

19. The article of manufacture of claim 16 wherein the computer-readable medium further includes instructions stored thereon to horizontally scroll the advertisement into the focus area.

20. The article of manufacture of claim 11 wherein the computer-readable medium further includes instructions stored thereon to vertically scroll the advertisement into the focus area.

21. The article of manufacture of claim 15, wherein the computer-readable medium has instructions stored thereon to conduct the entire transaction within the screen interface of the ticker.

22. A ticker for a video casting system, the ticker comprising:
   a focus area;
   a plurality of selectable items, wherein at least one of the items comprises an advertisement that is presented along with a video image;
   at least one scroll region along which the plurality of selectable items are to be automatically scrolled, the at least one scroll region passing through the focus area, the scroll region being displayed along a bottom side of a display screen;
   a navigation control to select an advertisement currently presented within the focus area to initiate a transaction related to the presented advertisement within the focus area;
   a ticker user interface (UI) to generate the focus area and the scroll region that presents the advertisement and to provide the navigation control to select that advertisement presented within the scroll region;
   a ticker application program interface (API) in communication with the ticker (UI) to control presentation of the indicator by the ticker UI and to provide the selectable items to the ticker UI; and
   a security application in communication with the ticker API to establish a secure connection between the ticker API and a remote location, the security application being configured to instruct the ticker API to control the ticker UI to present the indicator if the secure connection is established, the security application further being configured to encrypt and decrypt information exchanged between the ticker API and the remote location; and
   a security indicator to indicate that at least a portion of the initiated transaction is secure, wherein the indicator is displayed immediately upon activation of the navigation control and persists throughout the transaction.

23. The ticker of claim 22, further comprising a feed manager in communication with a video casting system and with the ticker API to control transmission of ticker data, associated with the selectable items, from the video casting system to the ticker API.

24. The ticker of claim 22 wherein the security application is integrated with software for the scroll region.

25. The ticker of claim 22 wherein the navigation control is to initiate the transaction in response to activation of a specifically-designated button on a remote control.

26. An apparatus, comprising:
   a means for receiving a trigger representing a purchase opportunity for an item in connection with a television program;
   a means for presenting a ticker having a screen interface on a portion of a display screen capable to display the television program, the ticker comprising a focus area and a plurality of items being automatically scrolled into and out of the focus area, the plurality of items including the first item associated with the trigger, the ticker comprising
      a ticker user interface (UI) to generate the focus area and a scroll region for presentation of the plurality of items and to provide a navigation control to select that item presented within the scroll region;
      a ticker application program interface (API) in communication with the ticker UI to control presentation of a security indicator by the ticker UI and to provide the plurality of items to the ticker UI; and
      a security application in communication with the ticker API to establish a secure connection between the ticker API and a remote location, the security application being configured to instruct the ticker API to control the ticker UI to present the security indicator if the secure connection is established, the security application further being configured to encrypt and decrypt information exchanged between the ticker API and the remote location;
   a means for scrolling an item into the focus area of the ticker;
   a means for initiating a transaction related to the presented item within the focus area of the ticker, if user response to the presented item is detected while the item is within the focus area; and
   a means for securely conducting at least a portion of the transaction within the screen interface of the ticker.

27. The apparatus of claim 26 wherein the means for securely conducting at least the portion of the transaction comprises:
   a means for establishing the secure connection with the remote location;
   a means for encrypting data entered by the user and for sending the encrypted data to the remote location; and
   a means for decrypting data received from the remote location and for presenting the decrypted data within the screen interface of the ticker.

28. The apparatus of claim 26, further comprising a means for presenting the security indicator along with the ticker during the portion of the transaction immediately upon receipt of the user response to indicate that the portion of the transaction is secure.

29. The apparatus of claim 26, wherein the means for securely conducting at least a portion of the transaction within the screen interface of the ticker comprises means for securely conducting the entire transaction within the screen interface of the ticker.

30. An apparatus for a video casting system, the apparatus comprising:
   at least one communication interface to receive a trigger representing an advertisement;
   a ticker software program comprising
      a ticker user interface (UI) to generate a focus area and a scroll region for presentation of advertisements and to provide a navigation control to select that advertisement presented within the scroll region; and
      a ticker application program interface (API) in communication with the ticker UI to control presentation of a security indicator by the ticker UI and to provide the advertisement to the ticker UI;
   a security application in communication with the ticker API to establish a secure connection between the ticker API and a remote location, the security application being configured to instruct the ticker API to control the ticker UI to present the security indicator if the secure connection is established, the security application further being configured to encrypt and decrypt information exchanged between the ticker API and the remote location;

a storage medium coupled to the communication interface to store the ticker software program and the security application;

a processor, coupled to the storage medium and to the communication interface, to cooperate with the ticker software program to automatically cycle the advertisement through the scroll region of a ticker; and an output section to superimpose the ticker over a full-screen presentation of a received television program image, the full-screen presentation filling substantially all of a television display screen, the ticker being configured to allow a transaction related to the advertisement to be securely conducted within the scroll region based on execution of the security application by the processor in response to activation of a specifically-designated button on a remote control device.

31. The apparatus of claim 30 wherein the ticker software program includes the security application.

32. The apparatus of claim 30 wherein the security application includes code to instruct the ticker to present the security indicator to indicate that the transaction is secure immediately upon a user responding to the advertisement.

33. The apparatus of claim 30 wherein the security application is configured to establish the secure connection with the remote location, the security application being further configured to encrypt user-entered data and send the encrypted data to the remote location, and being further configured to decrypt data received from the remote location.

34. A video casting system, comprising:
a source of ticker data; and
an apparatus coupled to the source, the apparatus including:
at least one communication interface to receive the ticker data;
a ticker software program comprising
a ticker user interface (UI) to generate a focus area and a scroll region for presentation of the ticker data and to provide a navigation control to select that ticker data presented within the scroll region; and
a ticker application program interface (API) in communication with the ticker UI to control presentation of a security indicator by the ticker UI and to provide the ticker data to the ticker UI;
a security application in communication with the ticker API to establish a secure connection between the ticker API and a remote location, the security application being configured to instruct the ticker API to control the ticker UI to present the security indicator if the secure connection is established, the security application further being configured to encrypt and decrypt information exchanged between the ticker API and the remote location;
a storage medium coupled to the communication interface to store the ticker software program and the security application;
a processor, coupled to the storage medium and to the communication interface, to cooperate with the ticker software program to automatically scroll the ticker data through the scroll region of a ticker, the scroll region intersecting the focus area; and
an output section to provide the ticker to a display screen capable to display the ticker with a substantially full-screen presentation of a received television program image, the full-screen presentation filling substantially all of a television display screen, the ticker being configured to allow a transaction related to the ticker data to be securely conducted within the scroll region based on execution of the security application by the processor in response to activation of a specifically-designated button on a remote control device when the ticker data is within the focus area.

35. The system of claim 34 wherein the security application includes code to instruct the ticker to present the security indicator to indicate that the transaction is secure immediately upon a user responding to the ticker data.

36. The system of claim 34 wherein the ticker software program is separate from but is configured to cooperate with the security application.

37. The system of claim 34 wherein the ticker is configured to receive user-entered responses via its scroll region and to provide the user-entered responses to the security application to allow the security application to encrypt the user-entered responses.

38. A method usable in a video casting system, the method comprising:
superimposing a ticker having a screen interface over a portion of a display screen capable to display a television program received from the video casting system, the ticker comprising a focus area and plurality of items being automatically scrolled into and out of the focus area, the ticker further comprising
a ticker user interface (UI) to generate the focus area and a scroll region that presents the plurality of items and to provide a navigation control to select that item presented within the scroll region;
a ticker application program interface (API) in communication with the ticker UI to control presentation of a security indicator by the ticker UI and to provide the plurality of items to the ticker UI; and
a security application in communication with the ticker API to establish a secure connection between the ticker API and a remote location, the security application being configured to instruct the ticker API to control the ticker UI to present the security indicator if the secure connection is established, the security application further being configured to encrypt and decrypt information exchanged between the ticker API and the remote location,
wherein the display screen comprises part of a television for the video casting system,
wherein a client terminal for the television is coupled to the display screen,
wherein the video casting system includes a plurality of sources, which provide ticker data to be displayed as items for the ticker, the plurality of sources being communicatively coupled to a plurality of broadcast centers,
wherein at least one of the broadcast centers is coupled to a server capable to provide the ticker data from the sources to the client terminal, and
wherein the video casting system is capable to provide the ticker data to the client terminal via different communication channels, including at least one of a plurality of television broadcast channels, an out-of-band channel, and a communication channel with a communication network;

scrolling an item into the focus area of the ticker;

if a user responds to the presented item while in the focus area by activating a specifically-designated control on a user input device, initiating a transaction related to the presented item with the user within the screen interface of the ticker;

securely conducting at least a portion of the transaction with the user within the screen interface of the ticker; and presenting the security indicator along with the ticker during the portion of the transaction to indicate that the portion of the transaction is secure immediately upon the user responding to the presented item.

39. The method of claim 38 wherein presenting the item within the screen interface of the ticker comprises presenting an advertisement.

40. The method of claim 38, wherein scrolling comprises horizontally scrolling the item into the focus area.

41. The method of claim 38 wherein scrolling comprises vertically scrolling the item into the focus area.

42. The method of claim 38, wherein the entire transaction is conducted within the screen interface of the ticker.

43. A video casting system, comprising:
a source of ticker data including:
    a feed server to receive a plurality of feeds of ticker data and having a feed engine to manipulate the ticker data received from the feeds;
    a production server coupled to the feed server to receive the ticker data manipulated by the feed engine, and coupled to a database having tables for the manipulated ticker data received from the feed server, the production server being capable to change a format of the manipulated ticker data to a format compatible with client terminals configured to present a screen interface on a display screen; and
    a distribution server to send the manipulated ticker data having the format compatible with the client terminals; and
a client terminal coupled to the distribution server of the source, the client terminal including:
    at least one communication interface to receive an ATVEF trigger containing an advertisement sent from the distribution server;
    a ticker software program comprising
        a ticker user interface (UI) to generate a focus area and a scroll region for presentation of the ticker data and to provide a navigation control to select that ticker data presented within the scroll region; and
        a ticker application program interface (API) in communication with the ticker UI to control presentation of a security indicator by the ticker UI and to provide the ticker data to the ticker UI;
    a security application in communication with the ticker API to establish a secure connection between the ticker API and a remote location, the security application being configured to instruct the ticker API to control the ticker UI to present the security indicator if the secure connection is established, the security application further being configured to encrypt and decrypt information exchanged between the ticker API and the remote location
    a storage medium coupled to the communication interface to store the ticker software program and the security application;
    a processor, coupled to the storage medium and to the communication interface, to cooperate with the ticker software program to control presentation of the advertisement within the scroll region of a ticker, wherein the ticker software program is to automatically scroll the advertisement along the scroll region into and out of the focus area; and
    an output section to superimpose the ticker over a received television program image, the ticker being configured to allow a transaction related to the advertisement to be securely conducted within the scroll region based on execution of the security application by the processor, the security application being executed in response to user activation of a specifically-designated button on a remote control when the advertisement is within the focus area, the ticker being further configured to present the security indicator to indicate that the transaction is secure immediately upon a user responding to the advertisement.

44. The system of claim 43 wherein the ticker software program is to horizontally scroll the advertisement along the scroll region into the focus area.

45. The method of claim 43, wherein the ticker software program is to vertically scroll the advertisement along the scroll region into the focus area.

* * * * *